Nov. 15, 1932.    T. H. THOMAS    1,887,702
MAINTAINING VALVE DEVICE
Filed Oct. 15, 1929
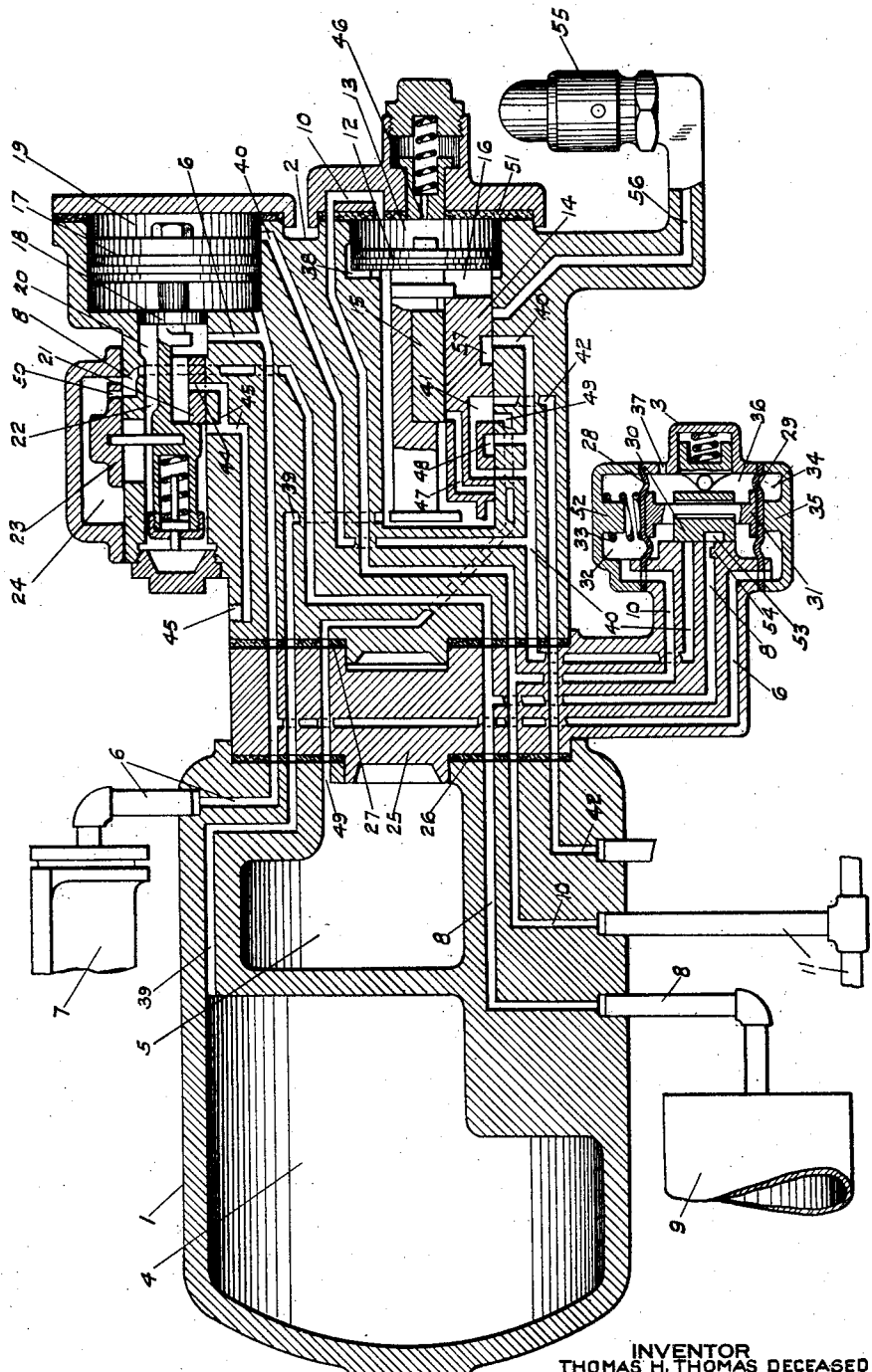
INVENTOR
THOMAS H. THOMAS DECEASED
MABLE M. THOMAS, EXECUTRIX.
BY
Wm. M. Cady
ATTORNEY Patented Nov. 15, 1932

1,887,702

UNITED STATES PATENT OFFICE

THOMAS H. THOMAS, DECEASED, LATE OF EDGEWOOD, PENNSYLVANIA, BY MABLE M. THOMAS, EXECUTRIX, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

MAINTAINING VALVE DEVICE

Application filed October 15, 1929. Serial No. 399,775.

This invention relates to fluid pressure brake equipment and more particularly to the type employed on locomotives.

In the usual locomotive fluid pressure brake equipment, a brake valve device is employed to reduce the pressure of fluid in a brake pipe, and a distributing valve device is operative upon a reduction in brake pipe pressure to apply the locomotive brakes. When the brake pipe pressure is suddenly reduced by the brake valve device to effect an emergency application of the brakes, a connection is established from the brake valve device to the distributing valve device through which fluid under pressure is supplied at a slow rate from the main reservoir direct to the application cylinder for maintaining a predetermined application of the brakes, this being desirable to prevent possible leakage from the application cylinder of the distributing valve device and the consequent release of the brakes, when not intended.

The principal object of the invention is to provide a fluid pressure brake equipment having improved means for maintaining the brake cylinder pressure in an emergency application of the brakes, said means being associated with the distributing valve device, so as to eliminate the necessity for the connection from the distributing valve device to the brake valve device, as above described.

In the accompanying drawing, the single figure is a diagrammatic view, partly in section and outline, of an improved distributing valve device embodying the invention.

As shown in the drawing, the distributing valve device is similar in construction to the well known type at present commonly employed with locomotive fluid pressure brake equipments and comprises a reservoir portion 1, a brake control portion 2 and a maintaining valve portion 3.

The reservoir portion 1 comprises a pressure chamber 4 and an application chamber 5 and is connected through a passage and pipe 6 to a brake cylinder 7, through a passage and pipe 8 to a main reservoir 9 and through a passage 10 to a brake pipe 11.

The brake control portion comprises an equalizing portion and an application portion. The equalizing portion is controlled by varying the pressure in the brake pipe 11 and comprises an equalizing piston 12 contained in a chamber 13 and a main slide valve 14 and auxiliary slide valve 15 contained in a chamber 16 and adapted to be operated by said piston. The application portion of the distributing valve device is adapted to be controlled by the equalizing portion and comprises two connected pistons 17 and 18 contained in chambers 19 and 20, respectively, an exhaust slide valve 21 contained in a chamber 22 and an application slide valve 23 contained in a chamber 24, said slide valves being adapted to be operated by the piston 17.

The maintaining valve portion 3 is preferably shown associated with the reservoir portion 1 and brake control portion 2 and comprises a filler block 25 interposed between gasket faces 26 and 27 of the reservoir portion and brake control portion, respectively. The maintaining valve portion further comprises two spaced, flexible diaphragms 28 and 29 and a slide valve 30 adapted to be operated by said diaphragms. The slide valve 30 is mounted in a stem 31 interposed between the inner faces of said diaphragms. At the outer face of diaphragm 28 is formed a chamber 32 which is connected through passage 10 to the brake pipe 11, said chamber containing a spring 33 adapted to urge the diaphragms 28 and 29 and slide valve 30 downwardly to the position shown in the drawing. At the outer face of diaphragm 29 is a chamber 34, which is connected through passage and pipe 6 to brake cylinder 7 and contains a stop lug 35 for engaging diaphragm 29 to limit the downward movement of the diaphragms and slide valve. A chamber 36 is found intermediate the diaphragms 28 and 29 and is connected to atmosphere through a passage 37.

In operation, fluid under pressure is supplied to the brake pipe 11 by the operation of a brake valve device (not shown) in the usual well known manner, and flows therefrom through passage 10 to the equalizing piston chamber 13. The pressure of fluid thus supplied to chamber 13 shifts the equalizing piston 12 and slide valves 14 and 15 to their normal release position, as shown in the drawing. In the release position of the equalizing piston 12, fluid under pressure flows from the piston chamber 13 through a feed groove 38 around said piston and to valve chamber 16 and from thence through a passage 39 to pressure chamber 4, thereby charging said chambers with fluid at brake pipe pressure.

In release position of the equalizing slide valve 14, the application piston chamber 19 is connected to the atmosphere through passage 40, cavity 41 in said slide valve and atmospheric passage and pipe 42. With the application piston chamber 19 thus vented, the application piston 17 and slide valves 21 and 23 assume the release position shown in the drawing, as will be evident from the following description.

With the application slide valve 23 in release position, communication from chamber 24 to chamber 22 is cut off and fluid under pressure supplied from a main reservoir 9 through pipe and passage 8 to said chamber is bottled up. With the exhaust slide valve 21 in the release position, the brake cylinder 7 is connected to the atmosphere through pipe and passage 6, valve chamber 22, port 44 in said slide valve and atmospheric passage 45.

Diaphragm chamber 34 of the maintaining valve portion being connected through passage 6 to the brake cylinder 7 is normally at atmospheric pressure. Fluid at brake pipe pressure flows through passage 10 to diaphragm chamber 32 wherein it acts on diaphragm 28 to aid spring 33 to maintain said diaphragm, diaphragm 29 and slide valve 30 in the position shown in the drawing, in which a passage 8 from the main reservoir 9 and a passage 40 from the application piston chamber 19 are both lapped by said slide valve.

To effect a service application of the brakes, the pressure of fluid in brake pipe 11 is gradually reduced, causing a corresponding gradual reduction in pressure in the equalizing piston chamber 13. The pressure of fluid in the equalizing valve chamber 16 then shifts the equalizing piston and slide valves 14 and 15 to service position, in which said piston just engages a spring pressed stop 46.

In service position of slide valves 14 and 15, fluid under pressure is permitted to flow from the pressure chamber 4 through passage 39, equalizing valve chamber 16, service port 47 in slide valve 14, which port is uncovered by slide valve 15, and passage 40 to application piston chamber 19 and also from passage 40 through a cavity 48 in slide valve 14 to the application chamber 5.

Fluid under pressure thus supplied to application piston chamber 19, shifts piston 17 and slide valves 21 and 23 to application position in which the brake cylinder exhaust passage 45 is lapped by the exhaust slide valve 21 and fluid at main reservoir pressure is permitted to flow from application valve chamber 24 through a port 50 in the application slide valve 23 to chamber 22 and from thence through passage and pipe 6 to brake cylinder 7 and thereby apply the brakes.

When the brake cylinder pressure effective in valve chamber 22 and through passage 6 at the left side of the application piston 17 becomes slightly greater than the pressure of fluid supplied to the application piston chamber 19, the application piston 17 is shifted to the right to lap position, in which port 50 in the application slide valve is lapped, so as to prevent further flow of fluid at main reservoir pressure to chamber 22 and from thence to the brake cylinder 7.

Since diaphragm chamber 32 of the maintaining valve device is connected through passage 10 to brake pipe 11 and diaphragm chamber 34 is connected through passage 6 to brake cylinder 7, the pressure in diaphragm chamber 32 is reduced and the pressure in diaphragm chamber 34 is increased during a service application of the brakes. In effecting a service application of the brakes the maximum brake cylinder pressure is obtained by making a full service reduction, which reduces the brake pipe pressure to a degree which just equals the brake cylinder pressure obtained. Thus, the opposing fluid pressures in diaphragm chambers 32 and 34 become equal and the pressure of spring 33 maintains the diaphragms 28 and 29 and slide valve 30 in the position shown in the drawing.

Sometimes in effecting a full service application of the brakes, the brake pipe pressure is reduced below that required or after an application of the brakes, leakage from the brake pipe may reduce the brake pipe pressure below that necessary to fully apply the brakes. In such a case, the brake pipe pressure in diaphragm chamber 32 will become reduced to a degree somewhat less than the degree of brake cylinder pressure in diaphragm chamber 34. The degree of pressure of the spring 33 on diaphragm 28 is sufficient however to compensate for any permissible over reduction of brake pipe pressure in diaphragm chamber 32 and therefore will maintain the maintaining valve diaphragms 28 and 29 and slide valve 30 in the position shown in the drawing.

For any degree of brake pipe reduction less than a full service reduction, the fluid pressure in diaphragm chamber 32 exceeds the fluid pressure in diaphragm chamber 34, and the maintaining valve diaphragms and slide valve will be maintained in the position shown in the drawing, as will be obvious from the above description.

If it is desired to effect an emergency application of the brakes, fluid under pressure is suddenly vented from brake pipe 11, thereby causing a sudden reduction of pressure in equalizing piston chamber 13. The pressure of fluid in equalizing valve chamber 16 then shifts the equalizing piston 12 and slide valves 14 and 15 to emergency position, in which the piston 12 shifts the spring pressed plunger 46 outwardly until said piston engages and seals on a gasket 51.

In emergency position of the equalizing slide valves 14 and 15, fluid under pressure is permitted to flow from the pressure chamber 4 through passage 39, equalizing valve chamber 16, past the left end of slide valve 14 to passage 40 which is connected to the application piston chamber 19. Fluid under pressure thus supplied to the application piston chamber causes an application of the brakes to be effected in the same manner as when a service application of the brakes is effected.

In emergency position of the equalizing slide valve 14, passage 49 from the application chamber 5 is lapped, so that the fluid pressure from the pressure chamber 4 flows only to the application piston chamber 19 and equalizes therein to provide a higher pressure than obtained when a service application of the brakes is effected and thereby apply the brakes with greater force so as to stop the locomotive quicker.

It is possible that leakage might reduce the pressure of fluid in the application piston chamber 19 and thereby tend to release the brakes, however in order to prevent such from occurring, the maintaining valve portion 3 operates to maintain the pressure in the application piston chamber substantially constant, as will be now described. It is of course understood that by maintaining the pressure in the application piston chamber 19, the pressure in the brake cylinder 7 is also maintained to correspond.

When the brake pipe pressure is suddenly reduced to effect an emergency application of the brakes, fluid under pressure is also suddenly vented from diaphragm chamber 32 of the maintaining valve portion 3 due to the connection from chamber 32 through passage 10 to the brake pipe. Fluid under pressure supplied to brake cylinder 7 to apply the brakes, also flows through passage 6 to diaphragm chamber 34 of the maintaining valve portion. With the fluid under pressure vented from diaphragm chamber 32, the pressure of fluid from the brake cylinder 7 acting in diaphragm chamber 34 is permitted to deflect diaphragm 29 upwardly, which deflects diaphragm 28 into engagement with stop 52 and shifts slide valve 30 to maintaining position.

In maintaining position of slide valve 30, cavity 53 in said slide valve connects passage 8 to passage 40. Fluid under pressure is thus permitted to flow from main reservoir 9 through passage 8, having a restricted portion 54, and cavity 53, to passage 40, which is connected to the application piston chamber 19, the rate of flow being governed by the restricted portion 54 of passage 8.

To prevent the supply of fluid under pressure to the application piston chamber 19 from building up a pressure therein greater than desired, a safety valve device 55 is also connected to said piston chamber through passage 56, cavity 57 in the equalizing slide valve 14 and passage 40. Said safety valve device is of the usual well known construction and is adapted to prevent a pressure build up in the application piston chamber greater than a predetermined amount as governed by its adjustment. The flow rate of the restricted portion 54 of passage 8 is less than the flow capacity of the safety valve device, so that the safety valve is permitted to perform the operation intended.

To release the brakes after an application, fluid under pressure is again supplied to the brake pipe 11 and from thence to equalizing piston chamber 13. The equalizing portion of the distributing valve device is thereby shifted to the release position in which the pressure chamber 4 is recharged with fluid under pressure and the application piston chamber 19 and application chamber 5 are again connected to the atmosphere in the same manner as hereinbefore described. Fluid under pressure is thus vented from the application piston chamber 19, which permits the pressure of fluid on the left side of the application piston to shift the application piston 17 and slide valves 21 and 23 to release position, as shown in the drawing, in which position fluid under pressure is vented from the brake cylinder 7 through pipe and passage 6, exhaust valve chamber 22, port 44 in exhaust slide valve 21 and atmospheric passage 45, thereby releasing the brakes.

In releasing the brakes, fluid at brake pipe pressure is restored to diaphragm chamber 32 of the maintaining valve portion and fluid under pressure is vented from diaphragm chamber 34 as the fluid under pressure is vented from the brake cylinder 7. The fluid pressure in chamber 32 in addition to the pressure of spring 33 is thereby permitted to deflect diaphragm 28 downwardy, thus shifting slide valve 30 to its normal position as shown in the drawing, in which position passages 8 and 40 are disconnected, thereby preventing further flow of fluid under pressure to the application piston chamber.

While one illustrative embodiment of the invention has being described in detail, it is not the intention to limit its scope to that embodiment or otherwise than by the terms of the appended claims.

Having now described the invention, what is claimed as new and desired to be secured by Letters Patent, is:

1. In a fluid pressure brake, the combination with a brake pipe and a brake cylinder, of a valve device operative by fluid under pressure supplied from one source upon a reduction in pressure in said brake pipe for supplying fluid under pressure to said brake cylinder to effect an application of the brakes, and means subject to the opposing pressures of said brake pipe and brake cylinder and also operative upon a reduction in brake pipe pressure for supplying fluid under pressure to said valve device.

2. In a fluid pressure brake, the combination with a brake pipe and a brake cylinder, of a valve device operative by fluid under pressure supplied from one source upon an emergency reduction in pressure in said brake pipe for supplying fluid under pressure to said brake cylinder to effect an emergency application of the brakes, and pneumatically operated means also operative upon an emergency reduction in brake pipe pressure for supplying fluid under pressure to said valve device, said pneumatically operated means being operated by the pressure of fluid in said brake cylinder.

3. In a fluid pressure brake, the combination with a brake pipe and a brake cylinder, of a valve device operative by fluid under pressure supplied from one source upon a reduction in pressure in said brake pipe for supplying fluid under pressure to said brake cylinder to effect an application of the brakes, and means operative by the pressure of fluid in said brake cylinder after a predetermined reduction in brake pipe pressure is effected for also supplying fluid under pressure to said valve device.

4. In a fluid pressure brake, the combination with a brake pipe and a brake cylinder, of a valve device operative by fluid under pressure supplied thereto upon a reduction in pressure in said brake pipe for supplying fluid under pressure to said brake cylinder to effect an application of the brakes, and means operative by the pressure of fluid in said brake cylinder after a predetermined reduction in brake pipe pressure is effected for also supplying fluid under pressure to said valve device, at a restricted rate.

5. In a fluid pressure brake, the combination with a brake pipe, a brake cylinder and a source of fluid under pressure, of a valve device operative by fluid under pressure supplied thereto upon a reduction in pressure in said brake pipe to supply fluid under pressure from said source to said brake cylinder to effect an application of the brakes, a safety valve device for limiting the pressure of fluid acting on said valve device, and valve means operative by the pressure of fluid in said brake cylinder, after the brake pipe pressure is reduced, to permit a restricted flow of fluid under pressure from said source to said valve device for maintaining the pressure of fluid acting on said valve device at the adjustment of said safety valve device.

6. In a fluid pressure brake, the combination with a brake pipe, a brake cylinder and a source of fluid under pressure, of a valve device operative by fluid under pressure supplied thereto upon a reduction in pressure in said brake pipe to supply fluid under pressure from said source to said brake cylinder to effect an application of the brakes, a safety valve device for limiting the pressure of fluid acting on said valve device, a slide valve for controlling a supply of fluid under pressure from said source to said valve device for maintaining the pressure of fluid acting on said valve device at the adjustment of said safety valve device, an abutment subject on one side to brake pipe pressure and another abutment connected to the first mentioned abutment and subject on one side to brake cylinder pressure and adapted to operate said slide valve when the brake pipe pressure acting on the first mentioned abutment is reduced below a predetermined degree.

7. In a fluid pressure brake, the combination with a brake pipe and a brake cylinder, of a valve device operative by fluid under pressure upon an emergency reduction in brake pipe pressure to supply fluid under pressure to said brake cylinder for effecting a predetermined application of the brakes, a safety valve device for limiting the pressure of fluid acting on said valve device, and means for maintaining the pressure of fluid acting on said valve device at the adjustment of said safety valve device, said means comprising an abutment subject on one side to brake pipe pressure and the pressure of a spring, another abutment connected to the first mentioned abutment and subject on one side to brake cylinder pressure, and a slide valve controlled by said abutments for controlling a supply of fluid under pressure to said valve device.

8. In a fluid pressure brake, the combination with a brake cylinder, of an application valve device for controlling the supply and exhaust of fluid under pressure to and from said brake cylinder, a brake pipe, an equalizing valve device operative upon a sudden reduction in brake pipe pressure for supplying fluid under pressure to said application valve device to effect an application of the brakes, a safety valve device connected to said application valve device through said equalizing valve device for limiting the pressure of fluid acting on said application valve device, and valve means operative to supply fluid under pressure to said application valve device for maintaining a constant pressure acting thereon, said means comprising a slide valve movable to one position to permit a flow of fluid under pressure to said application valve device, a pair of connected abutments for moving said slide valve, one of said abutments being subject on one side to brake pipe pressure, the other of said abutments being subject on one side to brake cylinder pressure, a spring acting on the first mentioned abutment for preventing the operation thereof by the brake cylinder pressure acting on the second mentioned abutment until after a predetermined reduction in brake pipe pressure is effected. and means for restricting the flow of fluid through said valve means to said application valve device for preventing the pressure of fluid acting on said valve device from building up beyond the setting of said safety valve device.

9. In a fluid pressure brake for a locomotive, the combination with a brake pipe and a brake cylinder, of a distributing valve device operative upon a reduction in brake pipe pressure to supply fluid under pressure to said brake cylinder to effect an application of the brakes, a safety valve device associated with said distributing valve device and adapted to control the operation of said distributing valve device to limit the pressure in said brake cylinder to a predetermined degree, and a valve device, also associated with said distributing valve device and operative by the pressure of fluid in said brake cylinder, after a predetermined reduction in brake pipe pressure is effected, for supplying fluid under pressure to said distributing valve device for causing said distributing valve device to operate to maintain the brake cylinder pressure at the degree governed by said safety valve device.

10. In a fluid pressure brake, the combination with a brake cylinder, of a valve device operative by fluid under pressure from one source for supplying fluid under pressure to said brake cylinder to effect an application of the brakes, and valve means operative by the pressure of fluid supplied to said brake cylinder for supplying fluid under pressure from another source for operating said valve device.

11. In a fluid pressure brake for a locomotive, the combination with a brake pipe and a brake cylinder, of an application valve device operative by fluid under pressure for supplying fluid under pressure to said brake cylinder, a valve device operative upon a reduction in brake pipe pressure to supply fluid under pressure to operate said application valve device, and valve means associated with said valve devices and operative by the pressure of fluid in said brake cylinder after a predetermined reduction in brake pipe pressure is effected for also supplying fluid under pressure from said source to said application valve device to operate same for maintaining the pressure of fluid in said brake cylinder against leakage.

In testimony whereof I have hereunto set my hand.

MABLE M. THOMAS,
*Executrix of the Last Will and Testament of Thomas H. Thomas, Deceased.*